(12) United States Patent
Gerken et al.

(10) Patent No.: US 6,242,697 B1
(45) Date of Patent: Jun. 5, 2001

(54) MOLDED PLASTIC ENCLOSURE

(75) Inventors: Michael Thomas Gerken, West Hartford; George Joseph Boucher, Plainville; Dominick Paul Squillace; Hermann F. Tremmel, both of Bristol, all of CT (US); Randall Dean Wise, New Ulm, MN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/322,437

(22) Filed: May 28, 1999

(51) Int. Cl.[7] ........................................ H02G 3/18
(52) U.S. Cl. .................... 174/65 R; 16/2.1; 248/68.1; 439/535
(58) Field of Search ...................... 174/65 R, 65 G, 174/135, 152 G, 153 G; 16/2.1, 2.2; 248/68.1, 237; 439/535

(56) References Cited

U.S. PATENT DOCUMENTS

| | | | |
|---|---|---|---|
| 4,675,782 | 6/1987 | Hibbert et al. | 361/356 |
| 5,728,973 | * 3/1998 | Jorgensen | 248/68.1 X |
| 5,950,277 | * 9/1999 | Tallmadge et al. | 16/2.1 |
| 5,959,250 | * 9/1999 | Daoud | 174/65 R |
| 6,031,182 | * 2/2000 | Daoud | 174/65 R |
| 6,103,973 | * 8/2000 | Sharp | 174/65 R |

FOREIGN PATENT DOCUMENTS

| | | | |
|---|---|---|---|
| 552521 | * 2/1943 | (BR) | 174/65 R |
| WO 094022195 | * 9/1994 | (WO) | 174/65 R |

* cited by examiner

Primary Examiner—Dean A. Reichard
Assistant Examiner—Dhiru R Patel
(74) Attorney, Agent, or Firm—Cantor Colburn LLP; Carl B. Horton

(57) ABSTRACT

A molded plastic enclosure of an electrical disconnect is presented. The disconnect has a switch mounted within the enclosure for manually disconnecting electrical equipment from a source of power. The disconnect enclosure includes a molded base hingedly attached to a cover. The base includes an interior compartment for mounting the disconnect switch therein. The base also includes a plurality of knockouts, which can be removed (knocked out) to provide access for electrical wiring. Each knockout has a plurality of concentric circular sections, each having an angular groove formed on their circumference. The smallest-diameter section includes a groove with a cross-sectional shape having a sharp corner (knife-edge) while the larger-diameter sections include grooves with cross sections having radiused corners. Additionally, the depth of the groove for smaller-diameter sections is greater than the depth of the groove for larger diameter sections.

23 Claims, 3 Drawing Sheets

MOLDED PLASTIC ENCLOSURE

BACKGROUND OF THE INVENTION

The present invention relates generally to enclosures. More specifically the present invention relates to molded plastic enclosures for electrical equipment.

Non-automatic (manual) electrical disconnects are located near electrical equipment such as motors, compressors, motor controls or other electrically driven machinery. Electrical disconnects allow maintenance personnel to manually isolate the machinery from electrical power when maintenance or replacement of the machinery is necessary, thus protecting the personnel from electric shock.

Industrial air conditioning and refrigeration equipment, and the disconnects that service this equipment, are often located on roof tops or other outdoor locations. Consequently, the electrical disconnects must not only protect personnel from the potential hazards of electric shock, but must also be water-resistant and tamper-proof.

Electrical disconnects generally comprise a disconnect switch assembly (switch) and related connecting equipment, e.g., lugs and ground terminals, housed within a disconnect enclosure (enclosure). When the disconnect is installed, the switch is electrically connected to both the power supply (line) wiring and the equipment (load) wiring via the lugs. Thus, the switch forms part of the electrical circuit providing electrical power to the electrically driven machinery.

The enclosure is generally shaped as an elongated parallelepiped, with a top wall, a bottom wall, a back wall, two side walls, and a cover. The cover allows access to the switch and related connecting equipment housed within the enclosure. The enclosure is generally constructed of plastic or metal, and it must meet a variety of accepted industry standards, including Underwriters' Laboratory (UL) standards or National Electric Code standards, depending on their use. One such standard is UL 50, entitled "Standard for Safety for Enclosures for Electrical Equipment."

A water-resistant metal enclosure of the prior art comprises a cover hingedly attached to the side walls near the top wall, such that the cover pivots upwardly to open. Water resistance is provided by a rain shield formed on the top wall, which extends downwardly over the top portion of the cover when the cover is in the closed position. Water resistance is further provided by rims extending from the periphery of the cover, which extend over a portion of the side and bottom walls when the cover is in the closed position. Unfortunately, the rain shield interferes with the opening of the cover. In addition, the cover, which pivots upwardly to open, must be held open by some mechanical means to allow the electrician to freely access the internal components.

These problems are overcome in the prior art by the slotted arrangement of the hinge attaching the cover to the side walls. The hinge comprises slots disposed in opposing rims of the cover, which accept dimples protruding outwardly from the upper end of each side wall. The slots allow the cover to slide downwardly to avoid the rain shield. The cover can then be pivoted upwardly to the open position. Once in the open position, the slots allow the cover to be pushed towards the side walls, where the cover is received by slots disposed in the side walls. The slots in the side walls hold the cover in an open position. Unfortunately, the manufacture and assembly of the complex metal cover and rain shield is time consuming and labor intensive. Additionally proper production tooling, e.g., welding equipment, must be used and maintained during the assembly process.

Enclosures for electrical disconnects further comprise a plurality of knockouts, which are generally located near the lower sections of the enclosure. The knockouts allow the electrician installing the disconnect to create circular access holes of predetermined diameters in the housing. The access holes allow the line and load wiring to pass into the enclosure. In addition, the access holes allow electrical conduit, which houses the line and load wiring, to be secured to the housing by standard connecting hardware. Generally, only two access holes are used, one for the line wiring and one for the load wiring. However, to allow flexibility in the installation of the disconnect, there are usually more than two knockouts in the enclosure.

The knockouts comprise a plurality of concentric circular sections formed by circular scores in the walls of the enclosure. Each section has a predetermined outside diameter corresponding to the diameter of standard electrical conduits. The scores in the enclosure allow the electrician installing the disconnect to remove, or knock out, the appropriate number of sections so that the diameter of the access hole corresponds to the size of electrical conduit being used.

It is important that the access hole formed by the knockout is properly fit to the mating conduit. Therefore, UL Standard 50 requires that the concentric sections of the knockout are capable of being removed (knocked out) one at a time starting with the smallest-diameter section and consecutively moving up to the larger-diameter sections. If multiple circular sections of the knockout are inadvertently removed during installation, the access hole could be too large for the conduit. Consequently, time-consuming adjustments would have to be made to fit the conduit to the enclosure.

Knockouts in metal enclosures of the prior art are formed during the manufacture of the enclosure by stamping the circular scores, which define the circumference of the concentric sections, into the enclosure. Discontinuities in each of the circular scores create a plurality of tabs extending radially across the concentric sections. To remove a section, the electrician breaks the tabs for that particular section. The remaining tabs provide the strength to hold the remaining sections in place. Metal enclosures of the prior art typically have three concentric sections to mate with three standard sizes of conduit.

Knockouts in plastic enclosures of the prior art are formed by molding the circular scores, which define the circumference of the concentric sections, into the enclosure. However, the use of knockouts in plastic enclosures presents a number of problems. First, plastic knockouts are inherently more difficult to remove than metal knockouts due to differences in material properties such as ductility. Consequently, the scores must be deep enough to allow easy removal of each section, but not so deep as to destroy the structural integrity of the non-removed sections. Second, the plastic knockouts must meet the requirement of UL Standard 50. That is, the concentric sections of the knockout must be capable of being removed one at a time. To meet this requirement, the depth of the circular score for smaller-radius sections must be greater than the depth of the circular score for larger-radius sections. In other words, for a pair of concentric sections, the circular score at the circumference of the inner section is deeper than the circular score at the circumference of the outer section, allowing the inner section to be more easily removed. Unfortunately, the aforementioned problems limit a plastic enclosure to having a knockout of only two concentric sections. The use of a greater number of concentric sections requires either that the largest-diameter section has a circular score of such shallow depth that the section can't be easily removed, or that the smallest-diameter section has a circular score so deep that the non-removed sections will have no structural integrity.

BRIEF SUMMARY OF THE INVENTION

In an exemplary embodiment of the invention, a molded plastic enclosure has a molded plastic base including a plurality of walls forming an interior compartment for mounting a electrical component therein. A knockout is formed in one of the plurality of walls. The knockout includes first and second circular sections. The first circular section has a first circumference formed by a first groove disposed in the wall. The first groove is shaped to include a knife-edge. The second circular section has a second circumference disposed about the first circumference. The second circumference is formed by a second groove disposed the wall, and the second groove is shaped to include a radiused edge.

BRIEF DESCRIPTION OF THE DRAWINGS

The present invention will now be described, by way of example only, with reference to the accompanying drawing in which.

DETAILED DESCRIPTION OF THE INVENTION

Figure 1:
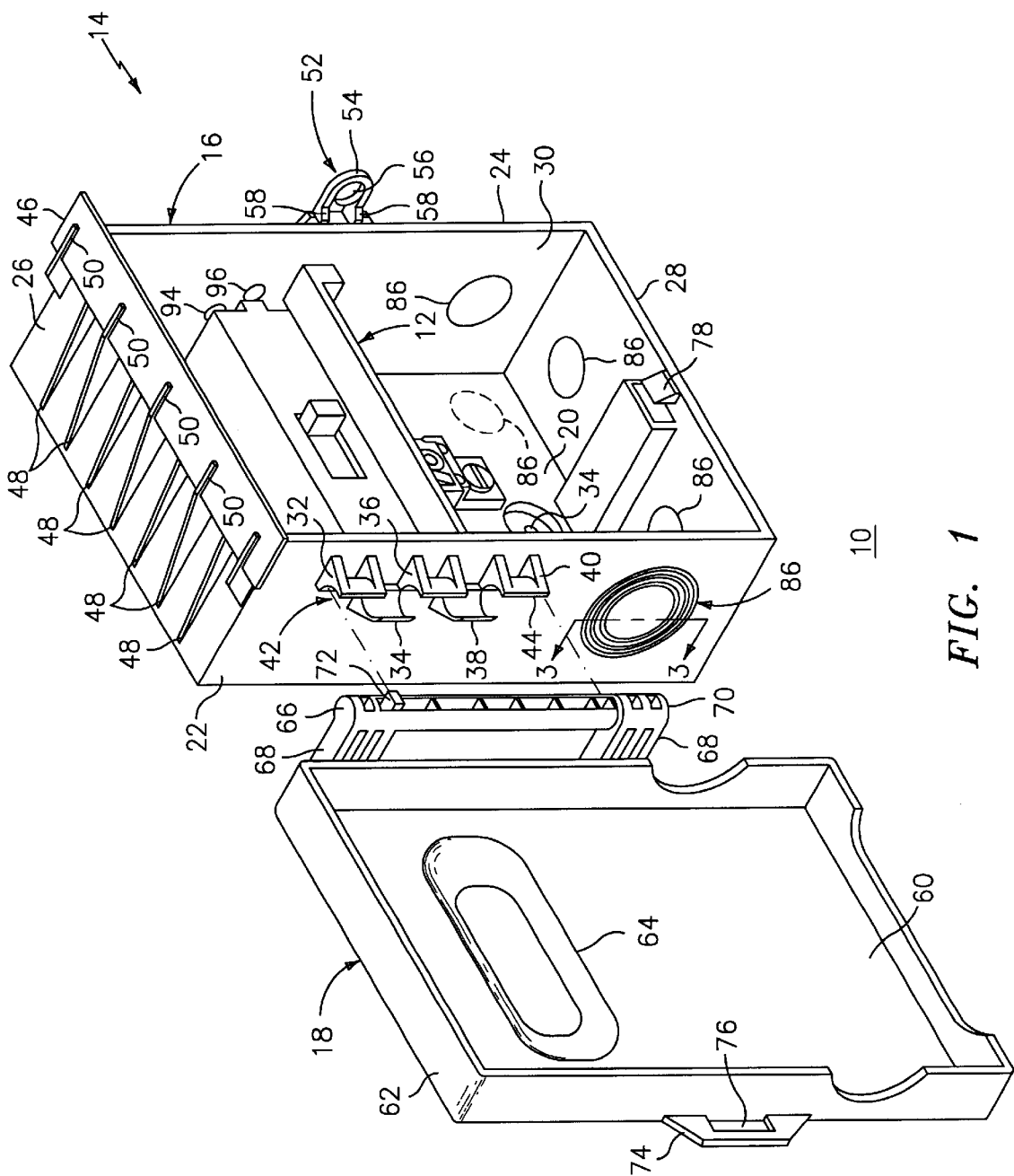
FIG. 1 is a perspective view of a fully assembled disconnect embodying the present invention.

Referring to FIG. 1 a perspective view of an exemplary embodiment of a fully assembled disconnect, such as used for air-conditioning or refrigeration equipment, is shown generally at 10. The disconnect 10 comprises a toggle-type disconnect switch 12 mounted within a disconnect enclosure 14. Switch 12 forms part of a circuit (not shown) for providing electric current to electrically powered equipment (not shown). Switch 12 serves to isolate the electrically powered equipment from a source of supply power, by enabling a user to manually break the circuit conducting the supply power to the equipment. It will be understood by one skilled in the art that, even though exemplary embodiments show a toggle-type disconnect switch, other types of disconnect switches may be mounted within the enclosure 14 as well. For example, pull-type disconnect switches may be used.

The disconnect enclosure 14 comprises a molded base 16 hingedly attached to a cover 18. In an exemplary embodiment, base 16 and cover 18 are molded from a phenylene-oxide plastic sold by General Electric under the trademark "NORLY". However, it will be understood by one skilled in the art that other plastic materials may be used as well.

Base 16 includes a rear wall 20, with a first side wall 22 and a second side wall 24 extending substantially perpendicular from opposing side boundaries of the rear wall 20. Additionally, base 16 includes an upper wall 26 and a lower wall 28, which extend substantially perpendicular from upper and lower boundaries of the rear wall 20, respectively. The rear wall 20, first side wall 22, second side wall 24, upper wall 26 and lower wall 28 define an interior compartment 30 of the base 16 for mounting the disconnect switch 12 therein.

First side wall 22 of base 16 includes a plurality of arcuate members 32, 34, 36, 38 and 40 extending outwardly therefrom. The arcuate members 32, 34, 36, 38 and 40 each include an inside surface, which, together, define a cylindrical opening 42. The inside surface of the lowest arcuate member, 40, has a locating tab 44 disposed thereon.

Upper wall 26 of base 16 includes a substantially "L" shaped shield 46 extending upwardly and outwardly therefrom. Shield 46 is supported by a plurality of triangular support members 48, which extend from the upper surface of upper wall 26 to shield 46. The upper surface of shield 46 includes a plurality of ribs 50 formed thereon for stiffening shield 46.

Second side wall 24 of base 16 includes a latch 52 extending therefrom. Latch 52 includes a resiliently flexible body 54 with a circular orifice 56 disposed therethrough. Orifice 56 is sized to accept the shackle of a standard padlock (not shown). Latch 52 further includes a plurality of angular detents 58 extending from a side of body 54 proximate second side wall 24.

Cover 18 includes a front panel 60 and a cover rim 62 that extends around the periphery of the front panel 60. Rim 62 is sized to overlap the outer surface of walls 20, 22, 24 and 26 of base 16 when cover 18 is closed and secured to base 16. This overlap provides protection against the ingress of rain or moisture into interior compartment 30. In addition, shield 46 overlaps the upper surface of cover rim 62 when cover 18 is closed and secured to base 16, thereby preventing the ingress of rain or moisture through the upper portion of cover 18. A raised portion 64 of the front panel 60 provides clearance for the handle of a pull-type disconnect switch (not shown), allowing the cover to close when a pull-type switch is installed in the place of the toggle-type switch 12.

Cover 18 further includes an axle 66 extending outwardly from a side portion of the rim 62 via extension arms 68. Axle 66 is engaged by arcuate members 32, 34, 36, 38 and 40 to form a hinge, which secures and aligns the cover 18 to the base 16. Axle 66 includes a locating groove 70 disposed in a lower portion thereof, and a stop tab 72 extending from an upper portion thereof.

Axle 66 is installed into the cylindrical opening 42 in a downward, axial direction. The axle 66 slides downward into the cylindrical opening 42 until the bottom surface of stop tab 72 abuts against the top surface of the uppermost arcuate member 32. Concurrently, the locating groove 70 engages the locating tab 44 of the lowermost arcuate member 40 in a snap-fit manner. Stop tab 72 and locating groove 70, in conjunction with locating tab 44, maintain the axial position of the axle 66 when the cover 18 is opened and closed.

Cover 18 further includes a hasp 74 extending outwardly from a side portion of the rim 62 opposite that from which axle 66 extends. Hasp 74 includes an opening 76 for receiving the body 54 of cover latch 52. As cover 18 is closed, body 54 passes through opening 76. Angular detents 58 contact the edge of opening 76 and cause the resiliently flexible body 54 to deflect. When the cover 18 is in the fully-closed position, the angular detents 58 have passed through opening 76, allowing the body 54 of cover latch 52 to straighten. The angular detents 58 engage the front panel 60 in a snap-fit manner to releasably secure the cover 18 in the closed position. Orifice 56 accepts the shackle of a padlock for locking the cover 18 in the closed position, thus making the enclosure tamper-resistant.

Figure 2:
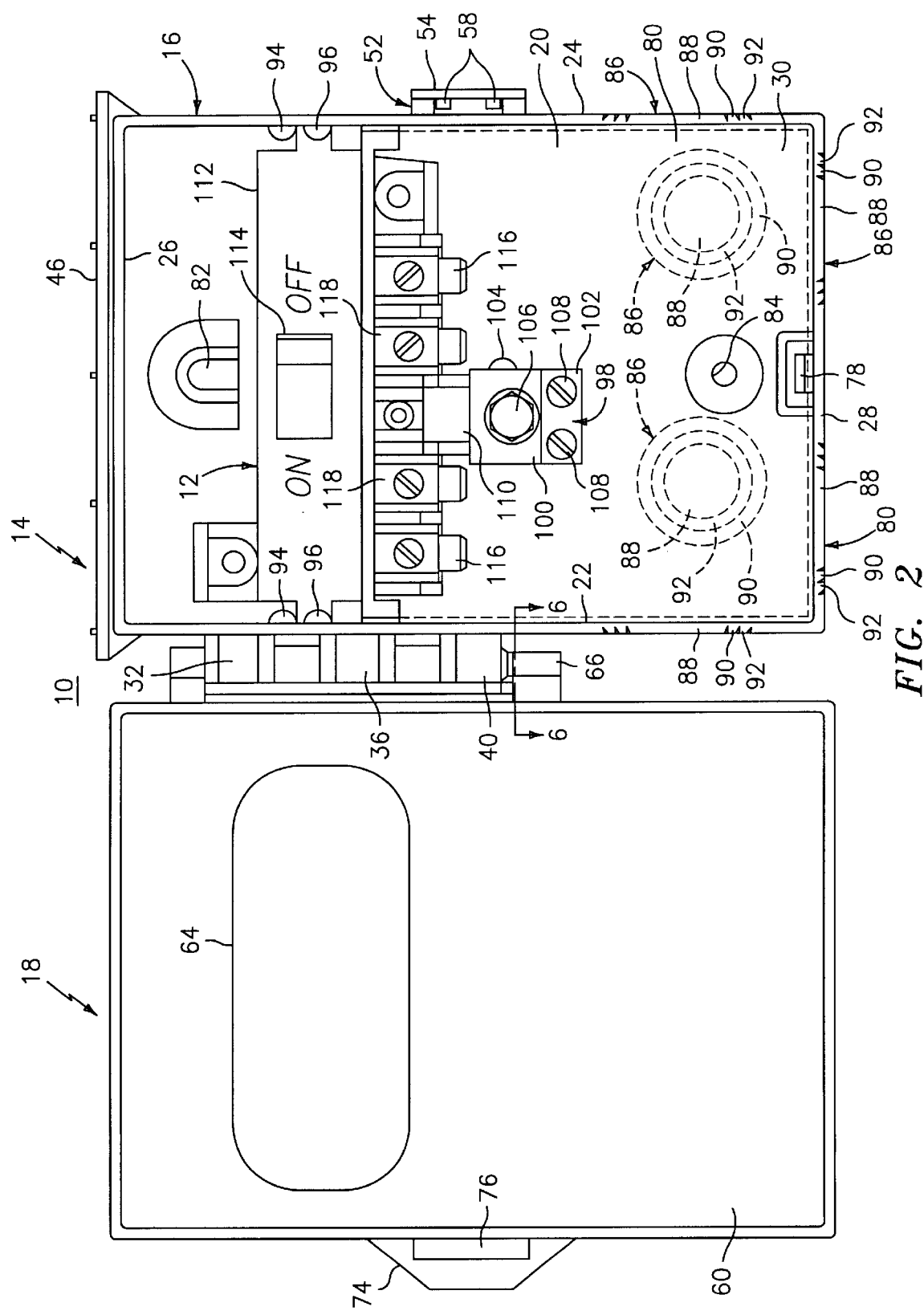
FIG. 2 is a front view of the fully assembled disconnect of FIG. 1.

Referring to FIG. 2, lower wall 28 of base 16 includes a dead front tab 78 extending therefrom. The dead front tab 78 secures a dead front panel 80 (shown in phantom) to the base 16 in snap-fit fashion. The dead front panel 80 extends from the lower half of switch 12 to the lower wall 28, thereby covering all exposed current carrying components to protect personnel from electrical shocks when cover 18 is open.

Base 16 includes a hooded mounting slot 82 and dimpled mounting hole 84 disposed through rear wall 20. Mounting slot 82 and dimpled mounting hole 84 are located in the upper and lower sections of the rear wall 20, respectively. Mounting slot 82 and dimpled mounting hole 84 receive fasteners (not shown), and thereby provide a means of mounting the enclosure 14 to a structural support (not shown).

Base 16 also includes a plurality of knockouts 86 formed in rear wall 20, bottom wall 28, and side walls 22 and 24. Knockouts 86 are located in the lower section of the base 16 to provide electrical access to the interior compartment 30 for standard sizes of conduit (not shown). As will be discussed further hereinafter, knockouts 86 are advantageously comprised of three concentric circular sections 88, 90 and 92. The circular sections are capable of being removed (knocked out) one at a time starting with the smallest section 88 and moving up to the larger sections 90 and 92, respectively.

Base 16 further includes protrusions 94 and 96 extending from a surface of side walls 22 and 24 proximal to interior compartment 30. Protrusions 94 and 96 abut the switch 12 to restrain movement of the switch in a substantially perpendicular direction to the rear wall 20, as well as a laterally upward direction to the rear wall 20, when the switch 12 is mounted in the enclosure 14. Switch 12 is restrained from moving in a lateral downward direction to the rear wall 20 by a ground terminal 98, which is mounted to rear wall 20.

Ground terminal 98 is substantially L-shaped and comprises a flat mounting leg 100 which extends along the rear wall 20, and a terminal leg 102 extending substantially perpendicular from mounting leg 100. The ground terminal 98 is screwed into a mounting hole 104 via mounting screw 106 through the mounting leg 100. Terminal leg 102 contains a pair of terminal lugs 108 disposed therein for connecting ground wires (not shown) thereto. Mounting leg 100 of the ground terminal 98 abuts against a lower edge 110 of the disconnect switch 12 to restrain movement of the switch 12 in a laterally downward direction to the rear wall 20.

The toggle-type disconnect switch 12 comprises a generally rectangular switch base 112, a toggle 114 having slideable contacts (not shown), a pair of line lugs 116, and pair of load lugs 118. Line wiring (not shown) enters the enclosure 14 through one or more of the knockouts 86 and connects with the line lugs 116. Similarly, load wiring (not shown) enters the enclosure through one or more of the knockouts 86 and connects with the load lugs 118. Neutral (ground) wires (not shown) for the air conditioning equipment are connected to ground through the terminal leg 102 of the ground terminal 98. When the toggle 114 is in the "on" position, the slideable contacts of the toggle 114 provide continuity between the line lugs 116 and the load lugs 118 respectively. When the toggle 114 is in the "off" position, the slideable contacts of the toggle 114 break continuity with the line lugs 116 and the load lugs 118 to interrupt current flow and provide electrical isolation to the air conditioning or refrigeration equipment.

Figure 3:
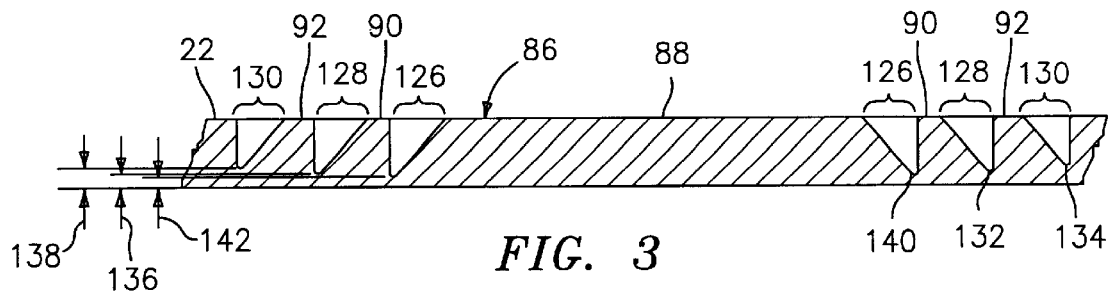
FIG. 3 is a cross-sectional view of a knockout found in the fully assembled disconnect of FIG. 1.

Referring to FIG. 3, a cross-sectional view of a knockout 86 taken along section 3—3 of FIG. 1 is shown. The concentric circular sections 88, 90 and 92 of the knockout 86 each comprise an angular groove 126, 128 and 130, respectively, formed on their circumference. The angular grooves 128 and 130 taper to radiused edges 132 and 134, respectively. The depth of angular grooves 128 and 130 create circumferential wall thicknesses 136 and 138, respectively. Conversely, angular groove 126 tapers to a sharp angle 140, hereinafter referred to as a knife-edge, with a circumferential wall thickness 147. As can be seen, the circumferential wall thickness for larger-diameter sections of the knockout is thicker than the circumferential wall thickness of smaller-diameter sections. For example, the circumferential wall thickness 138 of circular section 92 is thicker than the circumferential wall thickness 136 of circular section 90, which is, in turn, thicker than the circumferential wall thickness 142 of section 88. In other words, groove 126 is deeper than groove 128, which is deeper than groove 130.

Figure 4:
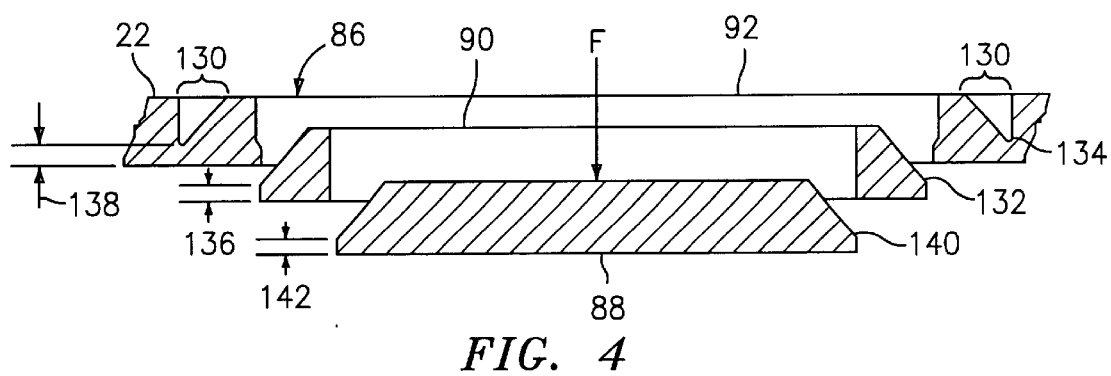
FIG. 4 is a cross-sectional view of the knockout in FIG. 3 with sections removed.

Referring to FIG. 4, two of the three circular sections, sections 88 and 90, are shown removed (knocked out). Advantageously, the knife-edge 140 combined with the thinnest circumferential wall thickness 142 (the deepest groove, 126) allows the material at the circumference of section 88 to shear under a force applied substantially in the "F" direction. Simultaneously, radiused edges 132 and 134 combined with thicker circumferential wall thicknesses 136 and 138 (shallower grooves 128 and 130) prevent the material at the circumference of sections 90 and 92 from shearing under the same force. Thus, section 88 can be knocked out or removed without dislodging sections 90 and 92. Similarly, when the circular section 90 is knocked out by a force substantially in the "F" direction, the radiused edge 134 combined with the circumferential wall thickness 138 provide the strength required to keep the circular section 92 from being dislodged. Thus, the circular sections 88, 90, and 92 are capable of being removed (knocked out) one at a time, starting with the smallest diameter section 88 and moving, consecutively, to sections 90 and 92. Contrary to prior art plastic knockouts, the use of the varying circumferential wall thicknesses 136, 138 and 142 (the varying depths of grooves 126, 128, and 130) along with the use of knife-edged groove 126 and radiused-edge grooves 128 and 130 allows the knockout 86 of the present invention to be advantageously comprised of the three circular sections 88, 90 and 92. It will be understood by one in the art that circular sections 88, 90, and 92 could further include a plurality of molded tabs (not shown), which extend between the circular sections.

Figure 5:
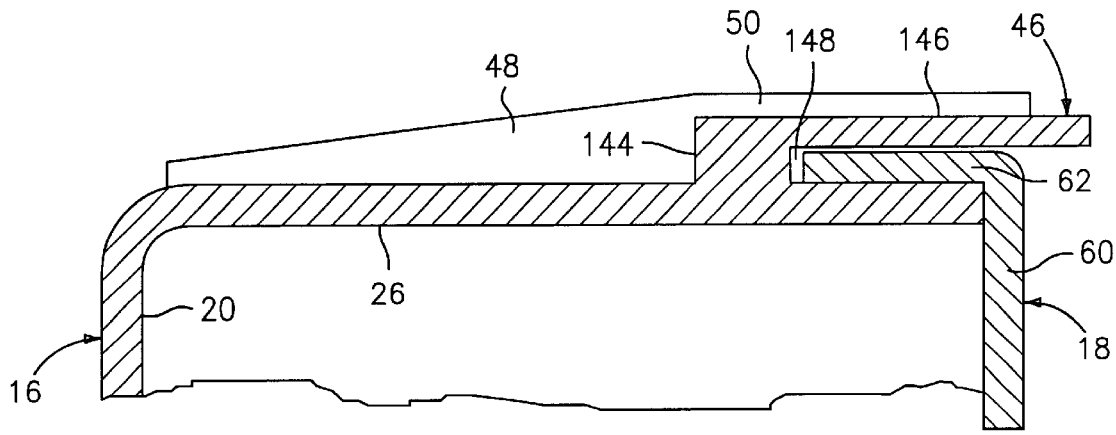
FIG. 5 is a cross-sectional view of a shield found in the fully assembled disconnect of FIG. 1.

Referring to FIG. 5, a cross-sectional view of cover 18 engaged with shield 46 is shown. Shield 46 is generally "L" shaped and includes a riser portion 144 and a top portion 146. Riser portion 144 extends substantially perpendicular from the upper wall 26. Top portion 146 is disposed on an end of riser portion 144 distal from upper wall 26 and extends above, and substantially parallel to, upper wall 26. Upper wall 26 and shield 46 form a substantially rectangular slot 148, which extends along the length of upper wall 26. Slot 148 accepts the upper portion of rim 62 of cover 18 when cover 18 is closed and secured to the base 16. When the cover 18 is closed, top portion 146 overlaps the rim 62 and extends outwardly beyond the front panel 60 of the cover 18, thereby providing a shield against rain and other forms of precipitation.

Figure 6:
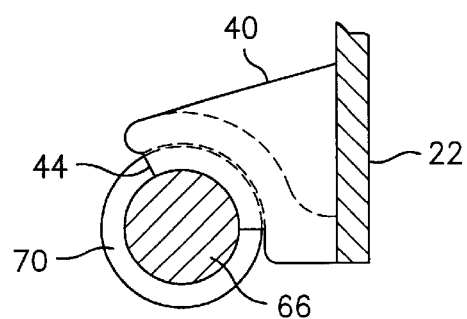
FIG. 6 is a cross-sectional view of a hinge axle and locating tab found in the fully assembled disconnect of FIG. 1.

Referring to FIG. 6, a cross-sectional view taken along section 6—6 of FIG. 2, is shown. FIG. 6 provides a detailed view of the locating groove 70 of axle 66 engaged with the locating tab 44 of arcuate member 40. Locating tab 44 is disposed on the inside surface of lowermost arcuate member 40.

While preferred embodiments have been shown and described, various modifications and substitutions may be made thereto without departing from the spirit and scope of the invention. Accordingly, it is understood that the present invention has been described by way of illustrations and not limitations.

What is claimed is:

1. A molded plastic enclosure comprising:
   a molded plastic base including,
      a plurality of walls forming an interior compartment for mounting an electrical component therein,
      a knockout formed in one of said plurality of walls, said knockout including,
         a first circular section having a first circumference formed by a first groove disposed in said one of said walls, said first groove having a knife-edge, and
         a second circular section having a second circumference disposed about said first circumference, said second circumference being formed by a second groove disposed in said one of said walls, said second groove having a radiused edge.

2. The molded plastic enclosure of claim 1, wherein said knockout further includes,
   a third circular section having a third circumference disposed about said second circumference, said third circumference being formed by a third groove disposed in said one of said walls, said third groove having a radiused edge.

3. The molded plastic enclosure of claim 1 wherein said first groove has a first depth greater than a second depth of said second groove.

4. The molded plastic enclosure of claim 2 wherein said first groove has a first depth greater than a second depth of said second groove, and said third groove has a third depth less than said second depth.

5. The molded plastic enclosure of claim 1 further comprising:
   first and second arcuate members extending outwardly from one of said plurality of walls, said first and second arcuate members defining a cylindrical opening therebetween, said first arcuate member having a locating tab extending therefrom; and
   a cover hingedly secured to said molded plastic base, said cover including,
      an axle extending from a side portion of said cover, said axle being pivotally disposed in said cylindrical opening for hingedly securing said cover to said molded plastic base, and
      a locating groove disposed about a radius of said axle, said locating groove receiving said locating tab.

6. The molded plastic enclosure of claim 1 further comprising:
   first and second arcuate members extending outwardly from one of said plurality of walls, said first and second arcuate members defining a cylindrical opening therebetween; and
   a cover hingedly secured to said molded plastic base, said cover including,
      an axle extending from a side portion of said cover, said axle being pivotally disposed in said cylindrical opening for hingedly securing said cover to said molded plastic base, and
      a stop tab extending radially from said axle, said stop tab including a lower surface for contacting an upper surface of said first arcuate member.

7. The molded plastic enclosure of claim 1 wherein:
   said plurality of walls includes,
      a rear wall,
      first and second side walls extending from opposing boundaries of said rear wall, said rear wall and said first and second side walls defining said interior compartment, and
      an upper wall extending from an upper boundary of said rear wall, said upper wall further defining said interior compartment; and
   said molded plastic base further includes,
      a shield disposed on said upper wall, said shield having an upper portion spaced from said upper wall to form a slot for slidably accepting a rim extending from a cover.

8. A molded plastic enclosure comprising:
   a molded plastic base including,
      a plurality of walls forming an interior compartment for mounting an electrical component therein,
      a knockout formed in one of said plurality of walls, said knockout including,
         a first circular section having a first circumference formed by a first groove disposed in said one of said walls,
         a second circular section having a second circumference disposed about said first circumference, said second circumference formed by a second groove disposed in said one of said walls, and
         a third circular section having a third circumference disposed about said second circumference, said third circumference formed by a third groove disposed in said one of said walls.

9. The molded plastic enclosure of claim 8 wherein said first groove includes a knife-edge, and said second groove includes a radiused edge.

10. The molded plastic enclosure of claim 8 wherein said first groove has a first depth greater than a second depth of said second groove.

11. The molded plastic enclosure of claim 8 further comprising:
   first and second arcuate members extending outwardly from one of said plurality of walls, said first and second arcuate members defining a cylindrical opening therebetween, said first arcuate member having a locating tab extending therefrom; and
   a cover hingedly secured to said molded plastic base, said cover including,
      an axle extending from a side portion of said cover, said axle being pivotally disposed in said cylindrical opening for hingedly securing said cover to said molded plastic base, and
      a locating groove disposed about a radius of said axle, said locating groove receiving said locating tab.

12. The molded plastic enclosure of claim 8 further comprising:
   first and second arcuate members extending outwardly from one of said plurality of walls, said first and second arcuate members defining a cylindrical opening therebetween; and a cover hingedly secured to said molded plastic base, said cover including,
an axle extending from a side portion of said cover, said axle being pivotally disposed in said cylindrical opening for hingedly securing said cover to said molded plastic base, and
a stop tab extending radially from said axle, said stop tab including a lower surface for contacting an upper surface of said first arcuate member.

13. The molded plastic enclosure of claim 8 wherein:
said plurality of walls includes,
a rear wall,
first and second side walls extending from opposing boundaries of said rear wall, said rear wall and said first and second side walls defining said interior compartment, and
an upper wall extending from an upper boundary of said rear wall, said upper wall further defining said interior compartment; and
said molded plastic base further includes,
a shield disposed on said upper wall, said shield having an upper portion spaced from said upper wall to form a slot for slidably accepting a rim extending from a cover.

14. A molded plastic enclosure comprising:
a molded plastic base including,
a plurality of walls forming an interior compartment for mounting an electrical component therein,
first and second arcuate members extending outwardly from one of said plurality of walls, said first and second arcuate members defining a cylindrical opening therebetween, said first arcuate member having a locating tab extending therefrom; and
a cover hingedly secured to said molded plastic base, said cover including,
an axle extending from a side portion of said cover, said axle being pivotally disposed in said cylindrical opening for hingedly securing said cover to said molded plastic base, and
a locating groove disposed about a radius of said axle, said locating groove receiving said locating tab.

15. The molded plastic enclosure of claim 14 wherein said axle further includes a stop tab extending therefrom, said stop tab including a lower surface for contacting an upper surface of said first arcuate member.

16. The molded plastic enclosure of claim 14 wherein said molded plastic base further includes,
an upper wall extending from an upper boundary of said rear wall, said upper wall further defining said interior compartment, and
a shield disposed on said upper wall, said shield having an upper portion spaced from said upper wall to form a slot for slidably accepting a rim extending from said cover.

17. A molded plastic enclosure comprising:
a molded plastic base including,
a rear wall,
first and second side walls extending from opposing side boundaries of said rear wall, said rear wall and said first and second side walls defining an interior compartment for mounting an electrical component therein,
an upper wall extending from an upper boundary of said rear wall, said upper wall further defining said interior compartment, and a shield disposed on said upper wall, said shield having an upper portion spaced from said upper wall to form a slot; and a cover hingedly secured to said molded plastic base, said cover including a front panel and a rim extending from a periphery of said front panel, said slot accepting said rim.

18. A plastic enclosure for manually disconnecting electrical equipment from a source of supply power, the plastic enclosure comprising:
a disconnect switch; and
a molded plastic base including,
a plurality of walls forming an interior compartment for mounting said disconnect switch therein,
a knockout formed in one of said plurality of walls, said knockout including,
a first circular section having a first circumference formed by a first groove disposed in said one of said walls, said first groove having a knife-edge, and
a second circular section having a second circumference disposed about said first circumference, said second circumference being formed by a second groove disposed in said one of said walls, said second groove having a radiused edge.

19. The plastic enclosure of claim 18, wherein said knockout further includes,
a third circular section having a third circumference disposed about said second circumference, said third circumference being formed by a third groove disposed in said one of said walls, said third groove having a radiused edge.

20. The plastic enclosure of claim 18 wherein said first groove has a first depth greater than a second depth of said second groove, and said third groove has a third depth less than said second depth.

21. The plastic enclosure of claim 18 further comprising:
first and second arcuate members extending outwardly from one of said plurality of walls, said first and second arcuate members defining a cylindrical opening therebetween, said first arcuate member having a locating tab extending therefrom; and
a cover hingedly secured to said molded plastic base, said cover including,
an axle extending from a side portion of said cover, said axle being pivotally disposed in said cylindrical opening for hingedly securing said cover to said molded plastic base, and
a locating groove disposed about a radius of said axle, said locating groove receiving said locating tab.

22. The plastic enclosure of claim 18 further comprising:
first and second arcuate members extending outwardly from one of said plurality of walls, said first and second arcuate members defining a cylindrical opening therebetween; and
a cover hingedly secured to said molded plastic base, said cover including,
an axle extending from a side portion of said cover, said axle being pivotally disposed in said cylindrical opening for hingedly securing said cover to said molded plastic base, and a stop tab extending radially from said axle, said stop tab including a lower surface for contacting an upper surface of said first arcuate member.

23. The disconnect of claim 18 wherein:

said plurality of walls includes,
   a rear wall,
   first and second side walls extending from opposing boundaries of said rear wall, said rear wall and said first and second side walls defining said interior compartment, and
   an upper wall extending from an upper boundary of said rear wall, said upper wall further defining said interior compartment; and said molded plastic base further includes,
   a shield disposed on said upper wall, said shield having an upper portion spaced from said upper wall to form a slot for slidably accepting a rim extending from a cover.

\* \* \* \* \*